(12) United States Patent
Huang

(10) Patent No.: US 10,232,982 B2
(45) Date of Patent: Mar. 19, 2019

(54) PACKAGE DEVICE FOR LIQUID CRYSTAL PANEL

(71) Applicant: Shenzhen China Star Optoelectronics Technology Co., Ltd., Shenzhen, Guangdong (CN)

(72) Inventor: Chong Huang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 260 days.

(21) Appl. No.: 15/168,273

(22) Filed: May 31, 2016

(65) Prior Publication Data

US 2016/0280418 A1 Sep. 29, 2016

Related U.S. Application Data

(62) Division of application No. 14/110,444, filed on Oct. 8, 2013, now Pat. No. 9,382,040.

(51) Int. Cl.
*B65D 21/08* (2006.01)
*B65D 85/48* (2006.01)
*G02F 1/13* (2006.01)

(52) U.S. Cl.
CPC .......... *B65D 21/086* (2013.01); *B65D 85/48* (2013.01); *G02F 1/13* (2013.01); *Y02W 30/807* (2015.05)

(58) Field of Classification Search
CPC ...... B65D 21/086; B65D 21/08; B65D 85/48; B65D 21/02; B65D 21/00; A45D 33/00; A45D 40/00; A47B 88/00
USPC .............................................................. 220/8
See application file for complete search history.

(56) References Cited

U.S. PATENT DOCUMENTS

| | | | | |
|---|---|---|---|---|
| 2,369,728 | A | * 2/1945 | Farkas | A47G 23/06 206/557 |
| 3,463,343 | A | * 8/1969 | Asenbauer | B65D 21/0213 220/532 |
| 4,564,118 | A | * 1/1986 | Heyer | F25D 25/021 220/8 |
| 2004/0188303 | A1 | * 9/2004 | Chouinard | B65D 25/06 206/456 |

* cited by examiner

*Primary Examiner* — Andrew Perreault
(74) *Attorney, Agent, or Firm* — Andrew C. Cheng

(57) ABSTRACT

Disclosed is a packaging device for a liquid crystal panel, including a first main body having a bottom and a plurality of sidewalls connected to sides of bottom. The sidewalls define at least one opening. At least one second main body has a bottom and sidewalls connected to the bottom and define an opening that is movably received in the at least one opening of the first main body such that the packaging device is expandable by moving the second main body in a direction away from the first main body.

18 Claims, 8 Drawing Sheets

PACKAGE DEVICE FOR LIQUID CRYSTAL PANEL

CROSS REFERENCE TO RELATED APPLICATIONS

This is a divisional application of co-pending U.S. patent application Ser. No. 14/110,444, filed on Oct. 8, 2013.

BACKGROUND OF THE INVENTION

1. Field of the Invention

The present invention relates to the field of packaging device, and in particular to a packaging device for loading liquid crystal panel.

2. The Related Arts

The liquid crystal display (LCD) is a flat ultra-thin display device, which comprises a specific amount of color or black-and-white pixels disposed in front of a light source or reflective surface. Due to the advantages of low power consumption, high resolution, reduced thickness, and light weight, the LCD finds wide applications in the field of mainstream display. The panel of the LCD is mainly made of glass. As the development for the panel of the LCD is toward further ultra-thin and light-weighted, the manufacturers of the panels place extra emphasis on the protection of the panels, and thus the packaging and protection of the panel products attracts more attention.

The known packaging device of the liquid crystal display panel is a monolithically formed by injection molding of the material, mainly expanded polypropylene (EPP), or polyethylene (PE). As the size of the display panel increases, the manufacturing of such large-sized monolithic packaging device will require the larger injection molding equipment, which increases the difficulty of manufacturing as well as the cost. In addition, for environmental friendliness, the packaging device of display panel is preferred to be recyclable and reusable. For the known large-sized monolithic packaging device, the recycling ratio is often low due to the oversize and non-adjustable appearance.

SUMMARY OF THE INVENTION

The technical issue to be addressed by the present invention is to provide a packaging device for liquid crystal panel, which can be expanded when in use for loading large-sized panels, and the size of the packaging device can be reduced when idled or recycled to enhance the efficiency.

To achieve the above object, the present invention adopts the following technical solution.

The present invention provides a packaging device for liquid crystal panel, which comprises: a first main body, the first main body comprising a bottom and a plurality of side walls connected to the sides of the bottom, wherein one of the side walls forms an opening; a second main body, the second main body comprising a bottom and a plurality of side walls connected to the sides of the bottom, wherein one of the side walls forms an opening; wherein the opening of the second main body is slightly smaller than the opening of the first main body and the opening of the second main body faces towards the opening of the first main body; the second main body is movable adjustably into the first main body; the bottom and the side walls of the first main body and the bottom and the side walls of the second main body form a loading space for loading the liquid crystal panel.

According to a preferred embodiment of the present invention, the packaging device for liquid crystal panel comprises: a first main body, the first main body comprising a bottom, and a first side wall and a second side wall connected to two opposite sides of the bottom, wherein a first end of the first side wall and a first end of the second side wall are connected by a third side wall; a second end of the first side wall and a second end of the second side wall form an opening of the first main body; a second main body, the second main body comprising a bottom, and a fourth side wall and a fifth side wall connected to two opposite sides of the bottom, wherein a first end of the fourth side wall and a first end of the fifth side wall are connected by a sixth side wall; a second end of the fourth side wall and a second end of the fifth side wall form an opening of the second main body; wherein the opening of the second main body is slightly smaller than the opening of the first main body and the opening of the second main body faces towards the opening of the first main body; the second main body is movable adjustably into the first main body; the bottom, the first side wall, the second side wall and the third side wall of the first main body and the bottom, the fourth side wall, the fifth side wall and the sixth side wall of the second main body form a loading space for loading the liquid crystal panel.

In the above embodiment of the present invention, the bottom of the first main body is disposed with a track trench respectively at the two sides of the bottom close to the first side wall and the second side wall; the lower part of the bottom of the second main body is disposed with a guiding track respectively at a location corresponding to the fourth side wall and the fifth side wall; the guiding track matches the track trench for the second main body to move adjustably into the first main body.

In the above embodiment of the present invention, the bottom of the first main body is disposed with a buffer part respectively at a location close to the first end of the first side wall and the first end of the second side wall; the buffer part is connected to the first side wall and the second side wall in a protruding manner; the bottom of the second main body is disposed with a buffer part respectively at a location close to the first end of the fourth side wall and the first end of the fifth side wall; the buffer part is connected to the fourth side wall and the fifth side wall in a protruding manner.

In the above embodiment of the present invention, the second end of the first side wall and the second end of the second side wall are disposed respectively with a stuck trench; the second end of the fourth side wall and the second end of the fifth side wall are disposed respectively with a stuck point; the stuck trench and the stuck point match each other to prevent the second main body from disengaging from the first main body when moving adjustably inside the first main body.

In the above embodiment of the present invention, the first side wall and the second side wall are further disposed respectively with a locking stuck trench; the locking stuck trench and the stuck point match each other to lock the position of the second main body inside the first main body; wherein the two sides of the locking stuck trench are beveled chamfers.

In the above embodiment of the present invention, the bottom surface of the bottom of the second main body is disposed with at least an enhancement part; the enhancement part is connected to the bottom surface of the bottom of the second main body by screw or snap connection.

In the above embodiment of the present invention, the upper surface of the bottom of the first main body comprises a first plane and a second plane; the first plane is at a higher level than the second plane; the first plane and the second plane are connected by an inclined plane; the bottom of the second main body comprises a third plane as the bottom surface; the guiding track is disposed with a guiding track convex part at an end away from the opening; the guiding track convex is along the third plane and downwards; when the second main body enters the first main body, the third plane closely fits the first plane and the guiding track convex closely fits the second plane so that the loading surface of the loading space is at a horizontal level; when the second main body expands beyond the first main body, the third plane closely fits the second plane, and the guiding track convex part closely fits the surface placing the packaging device so that the loading surface of the loading space is at a horizontal level.

In the above embodiment of the present invention, the first side wall and the second side wall are disposed respectively with a concave trench along the length direction; the fourth side wall and the fifth side wall are disposed respectively with a convex part; the convex part matches the concave trench.

According to another preferred embodiment of the present invention, the packaging device for liquid crystal panel comprises: a first main body, the first main body comprising a bottom, and a first side wall and a second side wall connected to two opposite sides of the bottom, wherein the two ends of the first side wall and the two ends of the second side wall respectively form a first opening and a second opening of the first main body; two second main bodies, each of the two second main bodies comprising a bottom, and a fourth side wall and a fifth side wall connected to two opposite sides of the bottom, wherein a first end of the fourth side wall and a first end of the fifth side wall are connected by a sixth side wall; a second end of the fourth side wall and a second end of the fifth side wall form an opening of the second main body; wherein the openings of the second main bodies are slightly smaller than the opening of the first main body and the openings of the second main bodies face respectively towards the first opening and the second opening of the first main body; the two second main bodies are movable adjustably into the first main body; the bottom, the first side wall, and the second side wall of the first main body and the bottom, the fourth side wall, the fifth side wall and the sixth side wall of the two second main bodies form a loading space for loading the liquid crystal panel.

The packaging device for the liquid crystal panel according to the present invention uses an assembly of two main bodies, and one of the two main bodies is able to move adjustably. During the manufacturing of the device, no large-sized injection molding equipment is required so as to reduce the manufacturing difficulty and the cost. Also, the packaging device can be expanded when in use for loading large-sized panels, and the size of the packaging device can be reduced when idled or recycled to enhance the efficiency.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

As aforementioned, the present invention is to address the disadvantages of known techniques. The present invention provides a packaging device for liquid crystal panel. The packaging device comprises: a first main body, the first main body comprising a bottom and a plurality of side walls connected to the sides of the bottom, wherein one of the side walls forms an opening; a second main body, the second main body comprising a bottom and a plurality of side walls connected to the sides of the bottom, wherein one of the side walls forms an opening; wherein the opening of the second main body is slightly smaller than the opening of the first main body and the opening of the second main body faces towards the opening of the first main body; the second main body is movable adjustably into the first main body; the bottom and the side walls of the first main body and the bottom and the side walls of the second main body form a loading space for loading the liquid crystal panel.

The packaging device for liquid crystal panel of the present invention can be expanded when in use for loading large-sized panels, and the size of the packaging device can be reduced when idled or recycled to enhance the efficiency.

The following detailed description refers to drawings and embodiments of the present invention.

First Embodiment

Figure 1:
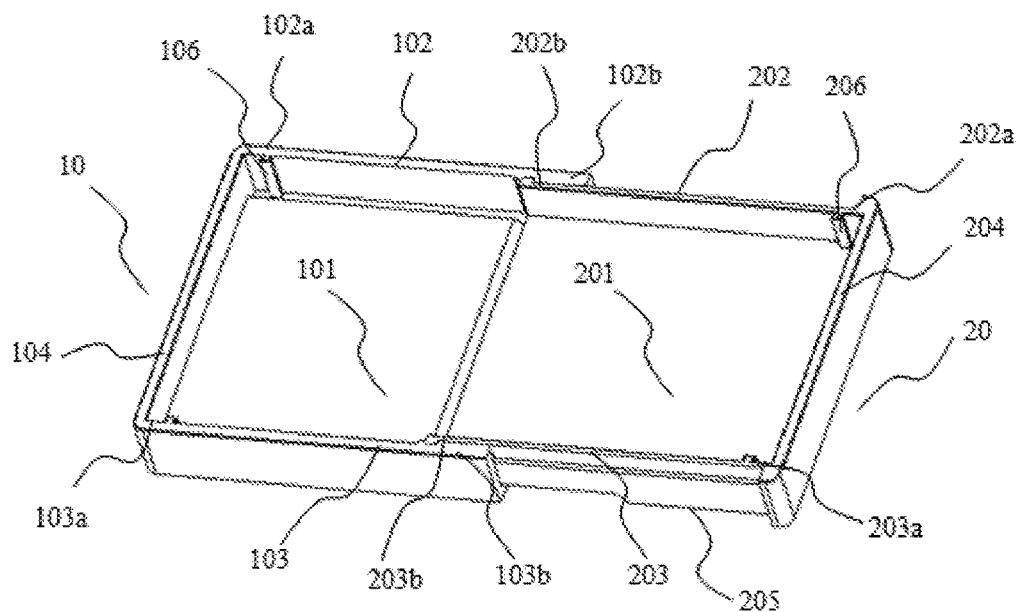
FIG. 1 is a schematic view showing a first embodiment of the packaging device when expanded according to the present invention.
Figure 2:
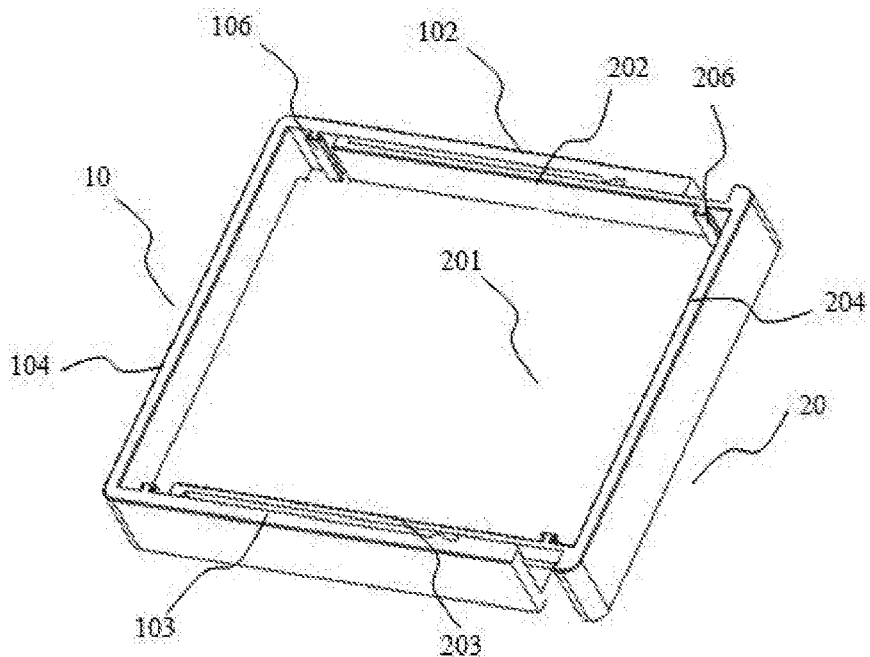
FIG. 2 is a schematic view showing the packaging device of FIG. 1 when reduced.
Figure 3:
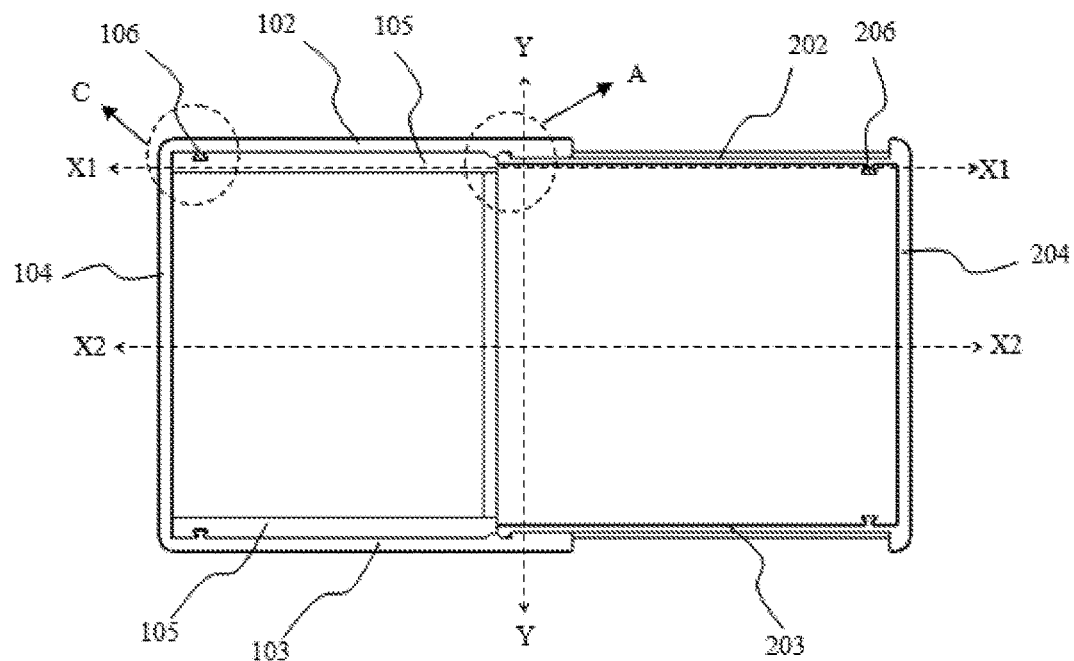
FIG. 3 is a top view of the packaging device of FIG. 1.

Referring to FIGS. 1-11, FIG. 1 is a schematic view showing a first embodiment of the packaging device when expanded according to the present invention; FIG. 2 is a schematic view showing the packaging device of FIG. 1 when reduced; and FIG. 3 is a top view of the packaging device of FIG. 1.

As shown in FIG. 1, the packaging device of the instant embodiment comprises: a first main body 10, the first main body 10 comprising a bottom 101, and a first side wall 102 and a second side wall 103 connected to two opposite sides of the bottom 101, wherein a first end 102a of the first side wall 102 and a first end 103a of the second side wall 103 are connected by a third side wall 104; a second end 102b of the first side wall 102 and a second end 103b of the second side wall 103 form an opening of the first main body 10; a second main body 20, the second main body 20 comprising a bottom 201, and a fourth side wall 202 and a fifth side wall 205 connected to two opposite sides of the bottom 201, wherein a first end 202a of the fourth side wall 202 and a first end 203a of the fifth side wall 203 are connected by a sixth side wall 204; a second end 202b of the fourth side wall 202 and a second end 203b of the fifth side wall 203 form an opening of the second main body 20.

In the instant embodiment, the opening of the second main body 20 is slightly smaller than the opening of the first main body 10, and the opening of the second main body 20 faces towards the opening of the first main body 10. The second main body 20 is able to move adjustably into the first main body 10. The bottom 101, the first side wall 102, the second side wall 103 and the third side wall 104 of the first main body 10 and the bottom 201, the fourth side wall 202, the fifth side wall 203 and the sixth side wall 204 of the second main body 20 form a loading space for loading the liquid crystal panel.

In the instant embodiment, the first main body 10 and the second main body 20 can be manufactured by an injection molding process. The material can be selected from anti-static polycarbonate (PC), polyethylene (PE), expandable polyethylene (EPE), expanded polypropylene (EPP), high density polyethylene (HDPE), and so on.

In the instant embodiment, the bottom 101 of the first main body 10 is disposed with a track trench 105 respectively at the two sides of the bottom 101 close to the first side wall 102 and the second side wall 103. The lower part of the bottom 201 of the second main body 20 is disposed with a guiding track 205 respectively at a location corresponding to the fourth side wall 202 and the fifth side wall 203. The guiding track 205 matches the track trench 105 for the second main body 20 to move adjustably into the first main body 10.

Figure 5:
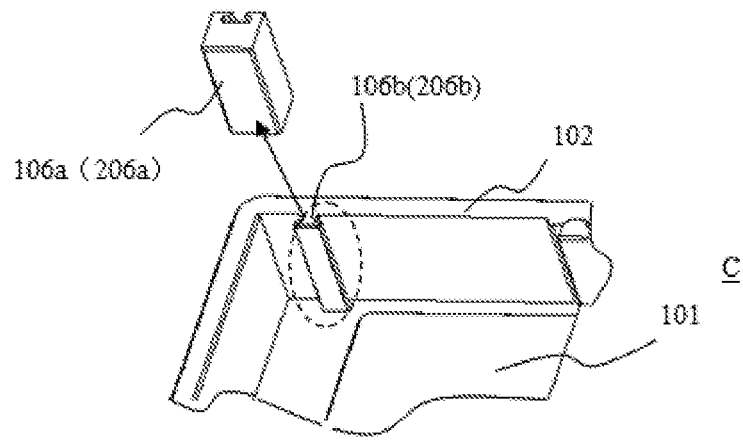
FIG. 5 is an enlarged partial view showing the structure C of the packaging device of FIG. 3.

In the instant embodiment, the bottom 101 of the first main body 10 is disposed with a buffer part 106 respectively at a location close to the first end 102a of the first side wall 102 and the first end 103a of the second side wall 103. The buffer part 106 is connected to the first side wall 102 and the second side wall 103 in a protruding manner. The bottom 201 of the second main body 20 is disposed with a buffer part 206 respectively at a location close to the first end 202a of the fourth side wall 202 and the first end 203a of the fifth side wall 203. The buffer part 206 is connected to the fourth side wall 202 and the fifth side wall 203 in a protruding manner. Referring to FIG. 5, the buffer parts 106, 206 comprise a protruding part 106b, 206b connected to the side walls 102, 103, 202, 203 in a protruding manner, and a matching concave part 106a, 206a. The concave part 106a, 206a and the protruding part 106b, 206b are engaged to form the buffer part 106, 206.

Figure 4:
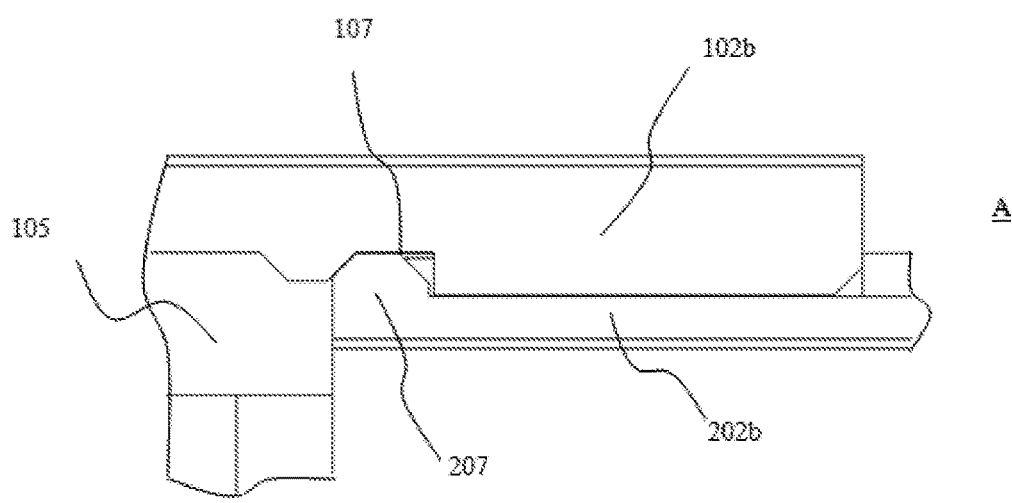
FIG. 4 is an enlarged partial view showing the structure A of the packaging device of FIG. 3.

In the instant embodiment, the second end 102b of the first side wall 102 and the second end 103b of the second side wall 103 are disposed respectively with a stuck trench 107. The second end 202b of the fourth side wall 202 and the second end 203b of the fifth side wall 203 are disposed respectively with a stuck point 207. The stuck trench 107 and the stuck point 207 match each other to prevent the second main body 20 from disengaging from the first main body 10 when moving adjustably inside the first main body 10. As shown in FIG. 4, a side of the stuck trench 107 away from the second end 102b is disposed as a beveled chamfer, and the stuck point 207 is disposed as a beveled chamfer. When the packaging device is expanded, the second main body 20 does not disengage from the first main body 10, and the relative positions of the second main body 20 and the first main body 10 are also fixed. When the packaging device is reduced, a force is applied to push the second main body 20 to make the stuck point 207 cross over the stuck trench 107 so as to accommodate the second main body 20 inside the first main body 10.

Figure 6:
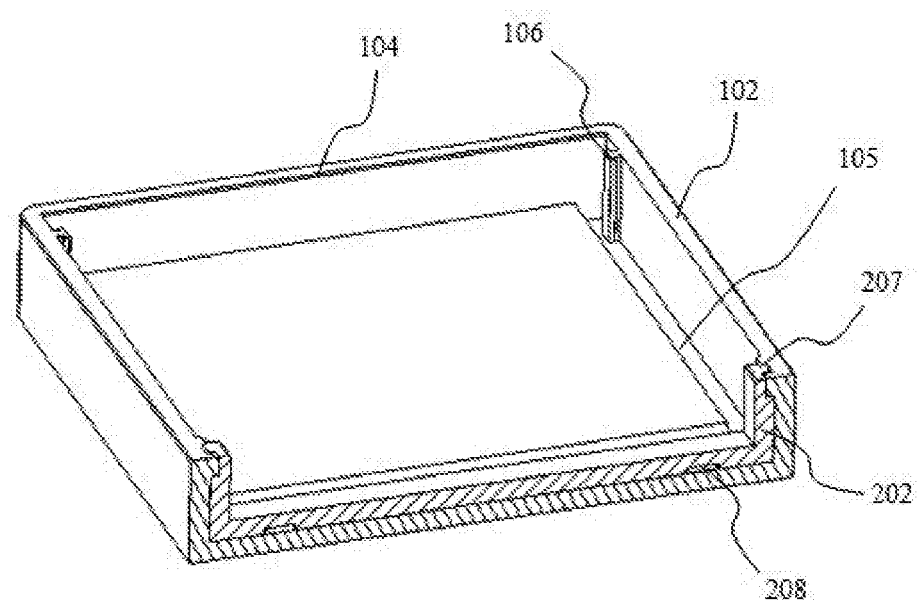
FIG. 6 is a schematic cross-sectional view along Y-Y direction of the packaging device of FIG. 3.

In the instant embodiment, the bottom surface of the bottom 201 of the second main body 20 is disposed with at least an enhancement part 208. The enhancement part 208 is connected to the bottom surface of the bottom 201 of the second main body 20 by screw or snap connection. As shown in FIG. 6, the material for the enhancement part 208 is preferably with higher rigidity, such as, SECC, SGCC, aluminum alloy, and so on.

Figure 7:
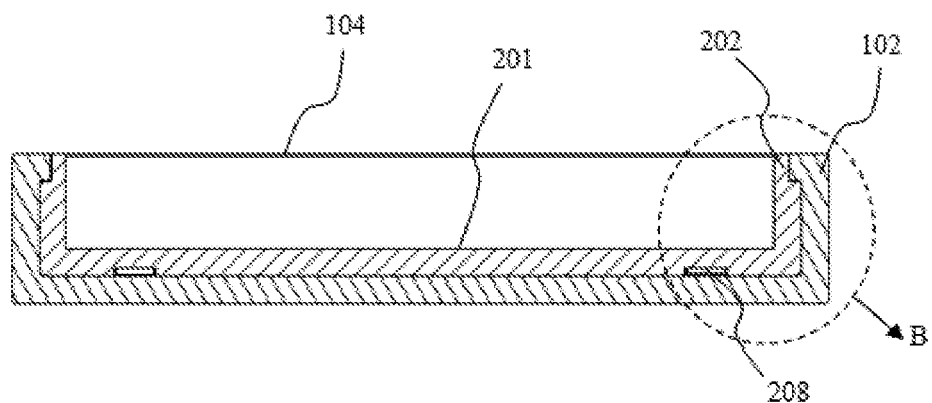
FIG. 7 is a main cross-sectional view along Y-Y direction of the packaging device of FIG. 3.
Figure 8:
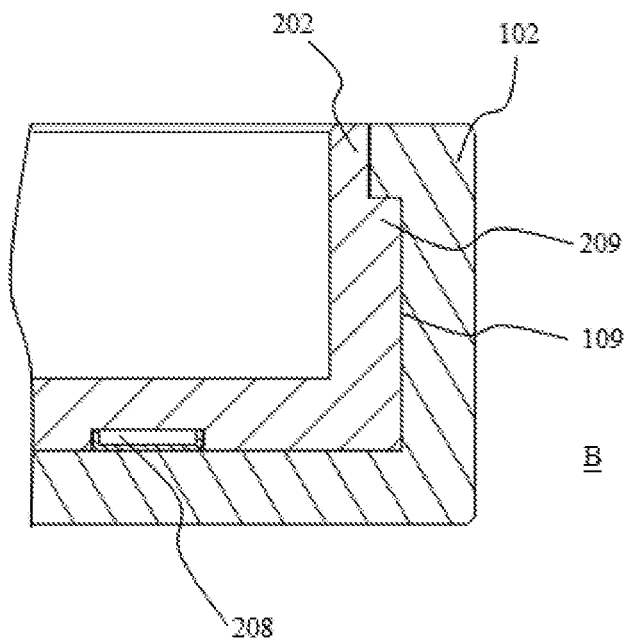
FIG. 8 is an enlarged partial view showing the structure B of the packaging device of FIG. 7.
Figure 9:
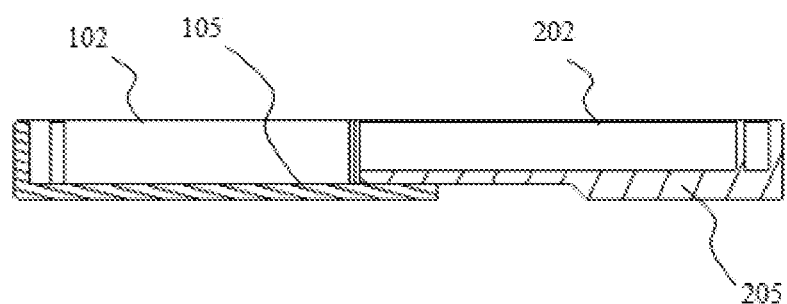
FIG. 9 is a cross-sectional view along X1-X1 direction of the packaging device of FIG. 3.
Figure 10:
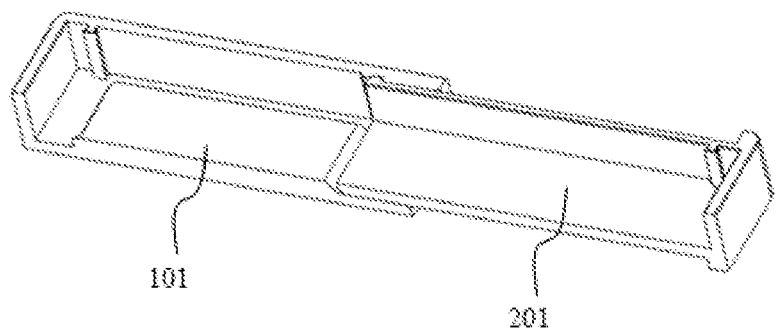
FIG. 10 is a schematic cross-sectional view along X2-X2 direction of the packaging device of FIG. 3.

Referring to FIGS. 7 and 8, in the instant embodiment, the first side wall 102 and the second side wall 103 are disposed respectively with a concave trench 109 along the length direction. The fourth side wall 202 and the fifth side wall 203 are disposed respectively with a convex part 209; the convex part 209 matches the concave trench 109 to prevent the second main body 20 from disengaging from the first main body 10 along the upward direction perpendicular to the bottom. Also, a gap is reserved between the convex part 209 and the concave trench 109 for the convenience of expansion and reduction of the packaging device.

Figure 11A:
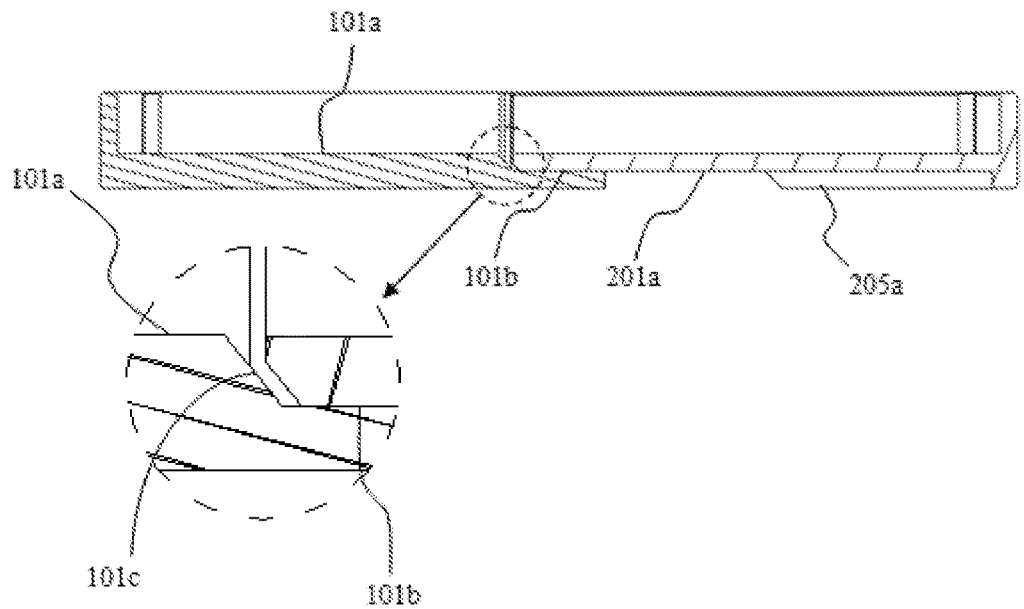
FIGS. 11A and 11B are cross-sectional views along X2-X2 direction of the packaging device of FIG. 3 in different situations, respectively.
Figure 11B:
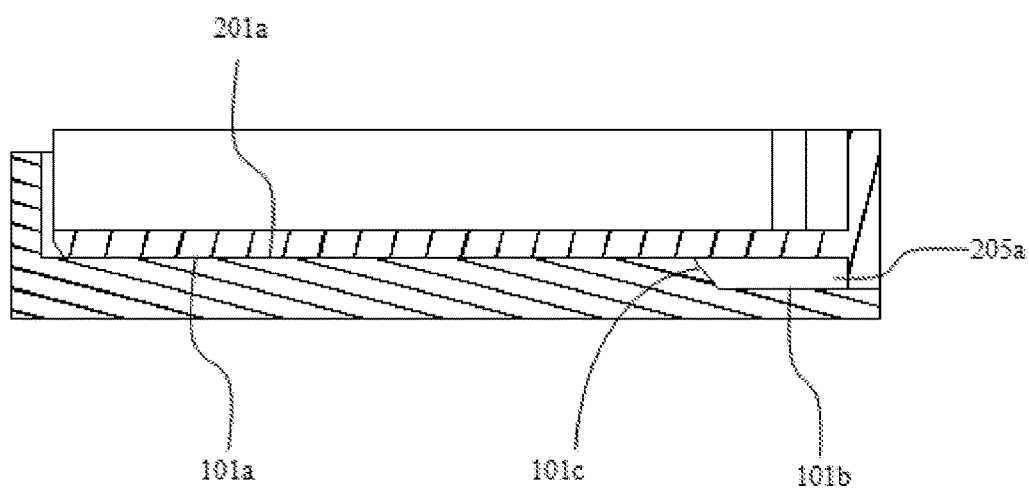

Referring to FIGS. 9, 10, 11A and 11B, the upper surface of the bottom 101 of the first main body 10 comprises a first plane 101a and a second plane 101b. The first plane 101a is at a higher level than the second plane 101b, and the first plane 101a and the second plane 102a are connected by an inclined plane 101c. The bottom 201 of the second main body 20 comprises a third plane 201a as the bottom surface. The guiding track 205 is disposed with a guiding track convex part 205a at the end away from the opening. The guiding track convex 205a is along the third plane 201a and downwards. When the second main body 20 enters the first main body 10, the third plane 201a closely fits the first plane 101a and the guiding track convex closely 205a fits the second plane 101b so that the loading surface of the loading space is at a horizontal level as shown in FIG. 11B. When the second main body 20 expands beyond the first main body 10, the third plane 201a closely fits the second plane 101b, and the guiding track convex part 205a closely fits the surface placing the packaging device so that the loading surface of the loading space is at a horizontal level as shown in FIG. 11A.

Second Embodiment

Figure 12:
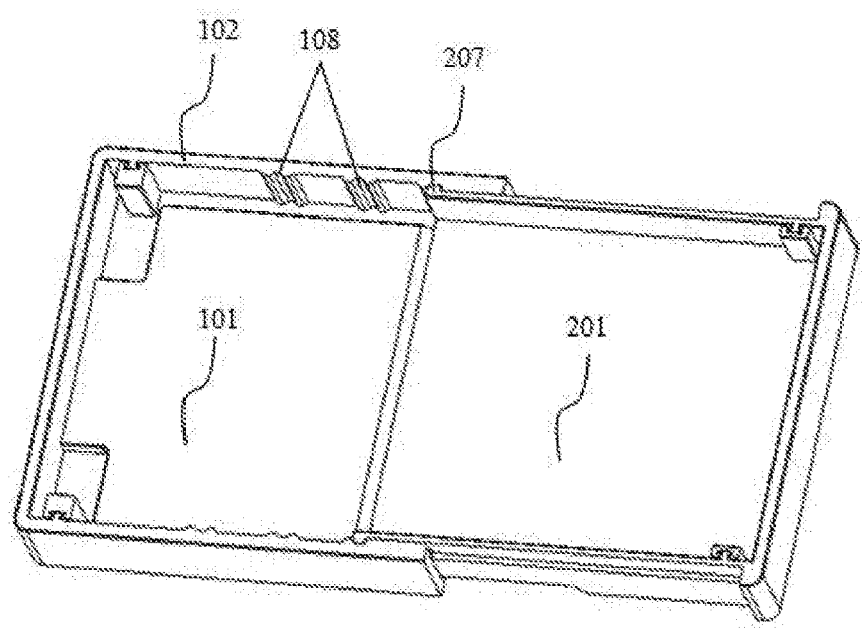
FIG. 12 is a schematic view showing a second embodiment of the packaging device when expanded according to the present invention.
Figure 13:
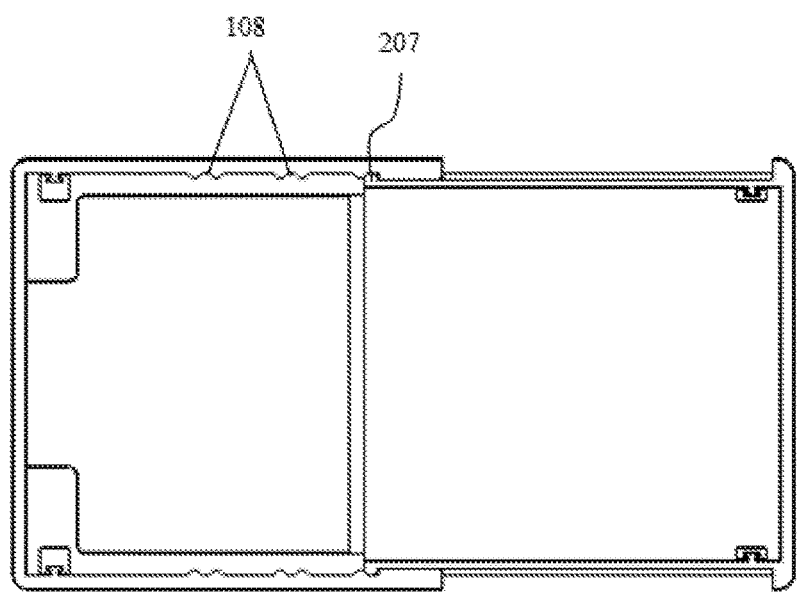
FIG. 13 is a top view of the packaging device of FIG. 12.
Figure 14:
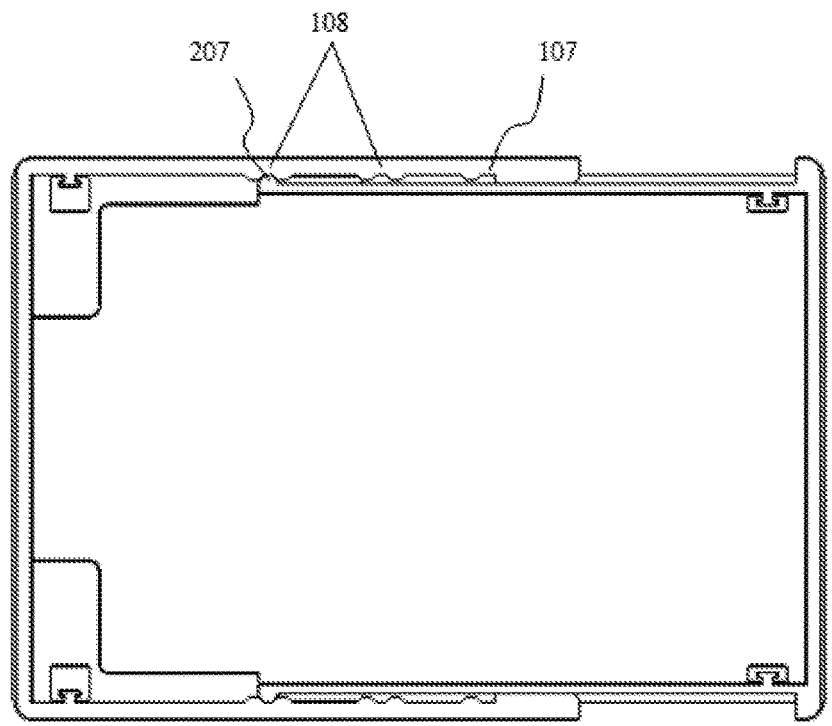
FIG. 14 is a schematic view showing the packaging device of FIG. 12 when reduced.

Referring to FIGS. 12-14, FIG. 12 is a schematic view showing a second embodiment of the packaging device when expanded according to the present invention; FIG. 13 is a top view of the packaging device of FIG. 12; and FIG. 14 is a schematic view showing the packaging device of FIG. 12 when reduced.

The second embodiment differs from the first embodiment in that, in the second embodiment, the first side wall 102 and the second side wall 103 are further disposed respectively with a locking stuck trench 108. The locking stuck trench 108 and the stuck point 207 match each other to lock in the position of the second main body 20 inside the first main body 10, wherein the two sides of the locking stuck trench 108 are beveled chamfers.

In the instant embodiment, a plurality of locking stuck trenches is disposed at the side wall so that the second main body 20 can be fixed at different positions inside the first main body 10. In other words, the packaging device can provide different sizes to accommodate the liquid crystal panels of different sizes.

Third Embodiment

Figure 15:
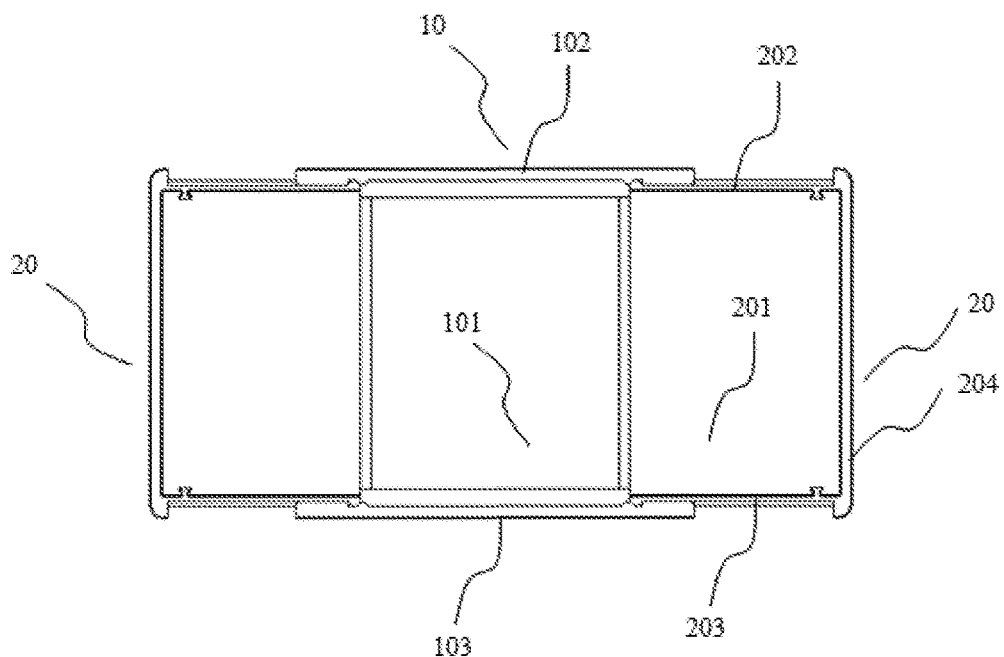
FIG. 15 is a top view showing a third embodiment of the packaging device when expanded according to the present invention.

FIG. 15 is a top view showing a third embodiment of the packaging device when expanded according to the present invention.

As shown in FIG. 15, the packaging device for liquid crystal panel of the instant embodiment comprises: a first main body 10, the first main body 10 comprising a bottom 101, and a first side wall 102 and a second side wall 103 connected to two opposite sides of the bottom 101, wherein the two ends of the first side wall 102 and the two ends of the second side wall 103 respectively form a first opening and a second opening of the first main body 10; two second main bodies 20, each of the two second main bodies 20 comprising a bottom 201, and a fourth side wall 202 and a fifth side wall 203 connected to two opposite sides of the bottom 201, wherein a first end 202a of the fourth side wall 202 and a first end 203a of the fifth side wall 203 are connected by a sixth side wall 204; a second end 202b of the fourth side wall 202 and a second end 203b of the fifth side wall 203 form an opening of the second main body 20; wherein the openings of the second main bodies 20 are slightly smaller than the openings of the first main body 10 and the openings of the second main bodies 20 face respectively towards the first opening and the second opening of the first main body 10; the two second main bodies 20 are able to move adjustably into the first main body 10; the bottom 101, the first side wall 102, and the second side wall 103 of the first main body 10 and the bottom 201, the fourth side wall 202, the fifth side wall 203 and the sixth side wall 204 of the two second main bodies 20 form a loading space for loading the liquid crystal panel.

The instant embodiment differs from the first embodiment in that the first main body of the packaging device of this embodiment is disposed with two opposite openings and the two second main bodies 20 can move adjustably through the two openings into the first main body 10.

In summary, the packaging device for the liquid crystal panel according to the present invention uses an assembly of two main bodies, and one of the two main bodies is able to move adjustably. During the manufacturing of the device, no large-sized injection molding equipment is required so as to reduce the manufacturing difficulty and the cost. Also, the packaging device can be expanded when in use for loading large-sized panels, and the size of the packaging device can be reduced when idled or recycled to enhance the efficiency.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A packaging device for a liquid crystal panel, comprising:

a primary body, which comprises a primary bottom and a first primary sidewall and a second primary sidewall respectively connected to two opposite sides of the primary bottom, the first primary sidewall having two opposite ends, the second primary sidewall having two opposite ends that correspond to and are spaced from the two ends of the first side wall such that the two ends of the first primary sidewall respectively define, with respect to the corresponding ends of the second primary sidewall, first and second receiving openings;

a secondary body, which comprises a secondary bottom and a first secondary sidewall and a second secondary sidewall connected to two opposite sides of the secondary bottom, the first secondary sidewall having a first distal end and a first proximal end opposite to each other, the second secondary sidewall having a second distal end and a second proximal end opposite to each other and respectively corresponding to the first distal end and the first proximal end, the first distal end and the second distal end being connected by a third secondary sidewall to define a secondary-body closed end, the first proximal end and second proximal end being spaced from each other to define a second-body open end;

a tertiary body, which comprises a tertiary bottom and a first tertiary sidewall and a second tertiary sidewall connected to two opposite sides of the tertiary bottom, the first tertiary sidewall having a third distal end and a third proximal end opposite to each other, the second tertiary sidewall having a fourth distal end and a fourth proximal end opposite to each other and respectively corresponding to the third distal end and the third proximal end, the third distal end and the fourth distal end being connected by a third tertiary sidewall to define a tertiary-body closed end, the third proximal end and third proximal end being spaced from each other to define a tertiary-body open end;

wherein the secondary-body open end and the tertiary-body open end are movably received in the first and second receiving openings of the primary body, respectively, with the secondary-body closed end and the tertiary-body closed end distant from each other, such that the secondary and tertiary bodies are respectively movable with respect to the primary body to adjust a distance between the secondary-body closed end and the tertiary-body closed end; and wherein the primary bottom and the first and second primary sidewalls of the primary body, the secondary bottom and the first, second, and third secondary sidewalls of the secondary body, and the tertiary bottom and the first, second, and third tertiary sidewalls of the tertiary body collectively define and delimit a loading space that is variable through adjustment of the distance between the secondary-body closed end and the tertiary-body closed end for loading therein the liquid crystal panel;

wherein the primary bottom of the primary body comprises track trenches respectively formed therein at locations adjacent to the first and second primary sidewalls and an underside of each of the secondary and tertiary bottoms of the secondary and tertiary bodies comprises guiding tracks formed thereon to respectively correspond to and mate the track trenches of the primary body for movement of the secondary and tertiary bodies with respect to the primary body; and wherein a surface of the primary bottom of the primary body comprises a first plane and a second plane such that the first plane is at a level than higher than the second plane and the first plane and the second plane are connected by an inclined plane extending therebetween; the guiding tracks are each provided with a guiding track convex part at an end away from the secondary-body open end, the guiding track convex extending along the underside of the secondary bottom and downwards; wherein when the secondary body is moved inwardly into the primary body to an inward, retracted position, the underside of the secondary bottom closely fits the first plane and the guiding track convex closely fits the second plane so that a loading surface of the loading space is at a horizontal level and when the secondary body is moved outwards with respect to the primary body to an outward, expanded position, the underside of the secondary bottom closely fits the second plane so that the loading surface of the loading space is at a horizontal level.

2. The packaging device as claimed in claim 1, wherein the primary bottom of the primary body comprises a buffer part formed thereon at a location close to each of the first and second primary sidewalls such that the buffer parts are connected to the first and second primary sidewalls; the secondary bottom of the secondary body comprises a buffer part formed thereon at a location close to each of the first and second secondary sidewalls such that the buffer parts are connected to the first and second secondary sidewalls; and the tertiary bottom of the tertiary body comprises a buffer part formed thereon at a location close to each of the first and second tertiary sidewalls such that the buffer parts are connected to the first and second tertiary sidewalls.

3. The packaging device for liquid crystal panel as claimed in claim 1, wherein at least one of the first and second primary sidewalls of the primary body comprises a stuck trench formed therein and the secondary body comprises a stuck point formed on the first and second secondary sidewalls thereof and selectively engageable with the stuck trench to retain the secondary body in the primary body.

4. The packaging device for liquid crystal panel as claimed in claim 1, wherein at least one of the first and second primary sidewalls of the primary body comprises a stuck trench formed therein and the tertiary body comprises a stuck point formed on the first and second tertiary sidewalls thereof and selectively engageable with the stuck trench to retain the tertiary body in the primary body.

5. The packaging device for liquid crystal panel as claimed in claim 1, wherein at least one of the first and second primary sidewalls of the primary body comprises two stuck trenches formed therein and the secondary and tertiary bodies each comprise a stuck point formed on the first and second secondary sidewalls of the secondary body and the first and second tertiary sidewalls of the tertiary body and respectively and selectively engageable with the stuck trenches to retain the secondary and tertiary bodies in the primary body.

6. The packaging device as claimed in claim 1, wherein the secondary bottom of the secondary body comprises at least an enhancement part that is connected to an underside of the secondary bottom of the secondary body.

7. The packaging device as claimed in claim 1, wherein the tertiary bottom of the tertiary body comprises at least an enhancement part that is connected to an underside of the tertiary bottom of the tertiary body.

8. A packaging device for a liquid crystal panel, comprising:

a primary body, which comprises a primary bottom and a first primary sidewall and a second primary sidewall respectively connected to two opposite sides of the primary bottom, the first primary sidewall having two opposite ends, the second primary sidewall having two opposite ends that correspond to and are spaced from the two ends of the first side wall such that the two ends of the first primary sidewall respectively define, with respect to the corresponding ends of the second primary sidewall, first and second receiving openings;

a secondary body, which comprises a secondary bottom and a first secondary sidewall and a second secondary sidewall connected to two opposite sides of the secondary bottom, the first secondary sidewall having a first distal end and a first proximal end opposite to each other, the second secondary sidewall having a second distal end and a second proximal end opposite to each other and respectively corresponding to the first distal end and the first proximal end, the first distal end and the second distal end being connected by a third secondary sidewall to define a secondary-body closed end, the first proximal end and second proximal end being spaced from each other to define a second-body open end;

a tertiary body, which comprises a tertiary bottom and a first tertiary sidewall and a second tertiary sidewall connected to two opposite sides of the tertiary bottom, the first tertiary sidewall having a third distal end and a third proximal end opposite to each other, the second tertiary sidewall having a fourth distal end and a fourth proximal end opposite to each other and respectively corresponding to the third distal end and the third proximal end, the third distal end and the fourth distal end being connected by a third tertiary sidewall to define a tertiary-body closed end, the third proximal end and third proximal end being spaced from each other to define a tertiary-body open end;

wherein the secondary-body open end and the tertiary-body open end are movably received in the first and second receiving openings of the primary body, respectively, with the secondary-body closed end and the tertiary-body closed end distant from each other, such that the secondary and tertiary bodies are respectively movable with respect to the primary body to adjust a distance between the secondary-body closed end and the tertiary-body closed end; and wherein the primary bottom and the first and second primary sidewalls of the primary body, the secondary bottom and the first, second, and third secondary sidewalls of the secondary body, and the tertiary bottom and the first, second, and third tertiary sidewalls of the tertiary body collectively define and delimit a loading space that is variable through adjustment of the distance between the secondary-body closed end and the tertiary-body closed end for loading therein the liquid crystal panel;

wherein the primary bottom of the primary body comprises track trenches respectively formed therein at locations adjacent to the first and second primary sidewalls and an underside of each of the secondary and tertiary bottoms of the secondary and tertiary bodies comprises guiding tracks formed thereon to respectively correspond to and mate the track trenches of the primary body for movement of the secondary and tertiary bodies with respect to the primary body; and wherein a surface of the primary bottom of the primary body comprises a first plane and a second plane such that the first plane is at a level higher than the second plane and the first plane and the second plane are connected by an inclined plane extending therebetween; the guiding tracks are each provided with a guiding track convex part at an end away from the tertiary-body open end, the guiding track convex extending along the underside of the secondary bottom and downwards; wherein when the tertiary body is moved inwardly into the primary body to an inward, retracted position, the underside of the tertiary bottom closely fits the first plane and the guiding track convex closely fits the second plane so that a loading surface of the loading space is at a horizontal level and when the tertiary body is moved outwards with respect to the primary body to an outward, expanded position, the underside of the tertiary bottom closely fits the second plane so that the loading surface of the loading space is at a horizontal level.

9. The packaging device as claimed in claim 1, wherein the first and second primary sidewalls of the primary body each comprise a concave trench extending a moving direction of the secondary body and the first and second secondary sidewalls of the secondary body are each provided with a convex part corresponding to and mating the concave trench.

10. The packaging device as claimed in claim 1, wherein the first and second primary sidewalls of the primary body each comprise a concave trench extending a moving direction of the tertiary body and the first and second tertiary sidewalls of the tertiary body are each provided with a convex part corresponding to and mating the concave trench.

11. The packaging device as claimed in claim 8, wherein the primary bottom of the primary body comprises a buffer part formed thereon at a location close to each of the first and second primary sidewalls such that the buffer parts are connected to the first and second primary sidewalls; the secondary bottom of the secondary body comprises a buffer part formed thereon at a location close to each of the first and second secondary sidewalls such that the buffer parts are connected to the first and second secondary sidewalls; and the tertiary bottom of the tertiary body comprises a buffer part formed thereon at a location close to each of the first and second tertiary sidewalls such that the buffer parts are connected to the first and second tertiary sidewalls.

12. The packaging device for liquid crystal panel as claimed in claim 8, wherein at least one of the first and second primary sidewalls of the primary body comprises a stuck trench formed therein and the secondary body comprises a stuck point formed on the first and second secondary sidewalls thereof and selectively engageable with the stuck trench to retain the secondary body in the primary body.

13. The packaging device for liquid crystal panel as claimed in claim 8, wherein at least one of the first and second primary sidewalls of the primary body comprises a stuck trench formed therein and the tertiary body comprises a stuck point formed on the first and second tertiary sidewalls thereof and selectively engageable with the stuck trench to retain the tertiary body in the primary body.

14. The packaging device for liquid crystal panel as claimed in claim 8, wherein at least one of the first and second primary sidewalls of the primary body comprises two stuck trenches formed therein and the secondary and tertiary bodies each comprise a stuck point formed on the first and second secondary sidewalls of the secondary body and the first and second tertiary sidewalls of the tertiary body and respectively and selectively engageable with the stuck trenches to retain the secondary and tertiary bodies in the primary body.

15. The packaging device as claimed in claim 8, wherein the secondary bottom of the secondary body comprises at least an enhancement part that is connected to an underside of the secondary bottom of the secondary body.

16. The packaging device as claimed in claim 8, wherein the tertiary bottom of the tertiary body comprises at least an enhancement part that is connected to an underside of the tertiary bottom of the tertiary body.

17. The packaging device as claimed in claim 8, wherein the first and second primary sidewalls of the primary body each comprise a concave trench extending a moving direction of the secondary body and the first and second secondary sidewalls of the secondary body are each provided with a convex part corresponding to and mating the concave trench.

18. The packaging device as claimed in claim 8, wherein the first and second primary sidewalls of the primary body each comprise a concave trench extending a moving direction of the tertiary body and the first and second tertiary sidewalls of the tertiary body are each provided with a convex part corresponding to and mating the concave trench.

* * * * *